(12) United States Patent
Hartman et al.

(10) Patent No.: US 7,225,825 B1
(45) Date of Patent: Jun. 5, 2007

(54) VALVE SEAL AND METHOD OF INSTALLING A VALVE SEAL

(76) Inventors: Brian T. Hartman, 2253 E. Contessa Cir., Mesa, AZ (US) 85213; Thomas A. Hartman, 700 Capac Ct., St. Louis, MO (US) 63125

( * ) Notice: Subject to any disclaimer, the term of this patent is extended or adjusted under 35 U.S.C. 154(b) by 0 days.

(21) Appl. No.: 11/304,245

(22) Filed: Dec. 15, 2005

(51) Int. Cl.
*F16K 1/22* (2006.01)

(52) U.S. Cl. ............... 137/15.25; 137/315.23; 251/306; 277/641

(58) Field of Classification Search ............ 137/15.18, 137/15.25, 315.23; 251/305–308, 314; 277/641–643, 277/316
See application file for complete search history.

(56) References Cited

U.S. PATENT DOCUMENTS

| | | | |
|---|---|---|---|
| 2,754,136 A | 7/1956 | Phillips | |
| 2,762,601 A | 9/1956 | Clade | |
| 3,314,642 A * | 4/1967 | Kautz et al. | 251/307 |
| 3,356,333 A | 12/1967 | Scaramucci | |
| 3,356,336 A | 12/1967 | Maenaka | |
| 3,401,916 A | 9/1968 | Scaramucci | |
| 3,462,120 A | 8/1969 | Priese | |
| 3,504,886 A | 4/1970 | Hulslander et al. | |
| 3,529,619 A | 9/1970 | Drewry et al. | |
| 3,540,696 A | 11/1970 | Fawkes | |
| 3,544,066 A | 12/1970 | Fawkes | |
| 3,550,906 A * | 12/1970 | Mayers | 251/306 |
| 3,563,510 A | 2/1971 | Priese | |
| 3,591,133 A | 7/1971 | Miles et al. | |
| 3,713,660 A | 1/1973 | Luthe | |
| 3,726,503 A | 4/1973 | Fawkes | |
| 3,799,501 A | 3/1974 | Hartman | |
| 3,910,555 A | 10/1975 | Bertrem et al. | |
| 3,958,314 A | 5/1976 | Kurkjian, Jr. | |
| 4,006,882 A | 2/1977 | Bonafous | |
| 4,006,883 A | 2/1977 | Hilsheimer | |
| 4,023,773 A | 5/1977 | Wise | |
| 4,063,709 A | 12/1977 | Lorthiosis | |
| 4,083,529 A | 4/1978 | Santy et al. | |
| 4,174,557 A * | 11/1979 | Goto et al. | 29/890.124 |
| 4,175,578 A * | 11/1979 | Priese | 137/67 |
| 4,202,365 A | 5/1980 | Aoki et al. | |
| 4,266,754 A | 5/1981 | Ninomiya et al. | |
| 4,281,817 A | 8/1981 | Adams et al. | |
| 4,293,116 A * | 10/1981 | Hinrichs | 251/173 |

(Continued)

*Primary Examiner*—Eric Keasel
*Assistant Examiner*—John K. Fristoe, Jr.
(74) *Attorney, Agent, or Firm*—Thompson Coburn LLP

(57) ABSTRACT

An assembly comprises a valve, a valve seal, and a piece of epoxy. The valve comprises a valve gate, a housing, and a plurality of screws. The housing comprises a fluid passageway and a groove that extends into the housing from the fluid passageway. Each of the screws extends into the groove of the housing. The valve gate is movable relative to the housing between an opened and closed position. The valve seal is positioned at least partially within the groove. The piece of epoxy surrounds at least a portion of each of the screws and has a geometry that is interlocked with the valve seal and with each of the screws in a manner securing the valve seal to each of the screws and in a manner such that the valve seal is positioned to compress against the valve gate when the valve gate is in the closed position.

7 Claims, 4 Drawing Sheets

U.S. PATENT DOCUMENTS

| | | |
|---|---|---|
| 4,304,392 A | 12/1981 | Maciulaitis |
| 4,420,140 A | 12/1983 | Gachot |
| 4,508,315 A * | 4/1985 | Livorsi et al. .............. 251/173 |
| 4,632,360 A | 12/1986 | DeSalve |
| 4,635,945 A | 1/1987 | Beck |
| 4,712,768 A | 12/1987 | Herr et al. |
| 4,770,393 A | 9/1988 | Hubertson |
| 4,826,133 A | 5/1989 | Hiltebrand |
| 4,883,253 A | 11/1989 | Hashimoto et al. |
| 4,899,775 A | 2/1990 | Calvin |
| 4,988,076 A * | 1/1991 | Burton ....................... 251/306 |
| 4,993,720 A | 2/1991 | Ciotola |
| 5,071,140 A | 12/1991 | Quevedo del Rio |
| 5,158,265 A | 10/1992 | Miyairi |
| 5,263,444 A | 11/1993 | Prior et al. |
| 5,284,182 A | 2/1994 | McLennan |
| 5,538,029 A | 7/1996 | Holtgraver |
| 5,634,626 A | 6/1997 | Hartman |
| 5,692,758 A | 12/1997 | Wikstrom |
| 6,202,983 B1 | 3/2001 | Hartman et al. |
| 6,206,376 B1 | 3/2001 | Hartman et al. |
| 6,494,466 B1 | 12/2002 | Hartman et al. |

* cited by examiner

VALVE SEAL AND METHOD OF INSTALLING A VALVE SEAL

BACKGROUND OF THE INVENTION

The present invention pertains to the field of fluid shutoff valves. More particularly, the present invention pertains to valve seals that create seals between valve gates and valve housings.

Various types of fluid shutoff valves are utilized in numerous and different applications. While different styles of valves operate in different manners, each valve generally comprises a valve housing having a fluid passageway therethrough and a gate that moves relative to the housing in a manner such that the fluid passageway can be selectively and alternatively closed or opened. A butterfly valve, for example, typically comprises a circular or oval discoidal gate positioned within the fluid passageway of a valve housing at a location where the fluid passageway has a circular or oval cross-section. The gate of a butterfly valve is typically pivotal back and forth about a pivot axis that bisects the gate and that is oriented generally parallel to the opposite circular or oval faces of the discoidal gate. The pivot axis is also typically oriented perpendicular to fluid passageway in a manner bisecting the fluid passageway. The gate is typically dimensioned such that it is capable of completely or substantially blocking the fluid passageway when the gate is pivoted such that its opposite circular or oval faces are generally parallel or nearly parallel to the circular cross-section of the fluid passageway. The gate can be pivoted from this closed position to a fully opened position where its opposite circular or oval faces are oriented generally perpendicular to the circular cross-section of the fluid passageway. In such an opened position, the gate only minimally impedes fluid from flowing through the fluid passageway of the valve.

Some butterfly valves, such as large butterfly valves used for controlling the flow of water through dams, also comprise one or more valve seals configured to form a seal between the gate and the wall of the housing surrounding the gate when the gate is in the closed position. Each valve seal is typically partially positioned within an arcuate groove that extends radially outward into the housing wall from the fluid passageway. The valve seals can be formed of metal, rubber, polymeric material, or various other suitable materials. In some valves, the valve seals are substantially rigid and can be repositioned or adjusted in a manner to achieve the greatest congruency between the valve seals and the gate when the gate is in the closed position. In some valves, the valve seals may be resiliently deflectable in a manner such that they can resiliently deflect against the gate when the gate is in the closed position, and thereby maximize congruency.

Several design considerations influence the configuration of valve seals in butterfly valves. One such consideration is that very large pressure differentials across a gate of a butterfly valve may exist when the gate is in its closed position and the a valve seal must be able to maintain a seal between the housing and the gate while experiencing such pressure differentials. Additionally, when the gate of butterfly valve is in its opened position, high fluid flow rates through the valve may create pressure differentials between the fluid passageway and the grooves in which the valve seals are positioned. These pressure differentials act to draw the valve seals out of the grooves. As such, the valve seals must be firmly retained in the channels of the valve housing, even when not engaged with the gate.

SUMMARY OF THE INVENTION

In one aspect of the invention, a method of installing a valve seal comprises a step of providing a valve. The valve comprises a valve gate, a housing, and a plurality of screws. The housing comprises a fluid passageway that extends through the housing and also comprises a groove that extends into the housing from the fluid passageway. Each of the screws has threads that extend into the groove of the housing. The valve gate is movable relative to the housing between opened and closed positions. The method also comprises a step of installing an elastomeric valve seal at least partially into the groove. Additionally, the method comprises a step of at least partially filling the groove with a curable material in a manner such that the curable material surrounds at least a portion of each of the screws and such that, after curing the curable material, the curable material and the valve seal will be secured to each other by interlocking geometry. Still further, the method comprises a step of allowing at least a portion of the curable material to cure in a manner such that the curable material becomes cured material that secures the valve seal to the screws in a manner preventing the valve seal from being removed from the groove and in a manner such that the valve seal is positioned to compress against the valve gate when the valve gate is in the closed position.

In another aspect of the invention, an assembly comprises a valve, a valve seal, and a piece of epoxy. The valve comprises a valve gate, a housing, and a plurality of screws. The housing comprises a fluid passageway that extends through the housing and comprises a groove that extends into the housing from the fluid passageway. Each of the screws extends into the groove of the housing. The valve gate is movable relative to the housing between an opened and closed position. The valve seal is positioned at least partially within the groove. The piece of epoxy surrounds at least a portion of each of the screws and has a geometry that is interlocked with the valve seal and with each of the screws in a manner securing the valve seal to each of the screws and in a manner such that the valve seal is positioned to compress against the valve gate when the valve gate is in the closed position.

In yet another aspect of the invention, a method of repairing a valve comprises a step of providing a valve. The valve comprises a valve gate, a housing, a first valve seal, and a plurality of screws. The housing comprises a fluid passageway that extends through the housing. The housing also comprises a groove that extends into the housing from the fluid passageway. Each of the screws has threads that extend into the groove of the housing. The valve gate is movable relative to the housing between opened and closed positions. The first valve seal is engaged with the threads of the screws in a manner securing the first valve seal at least partially within the groove. The method also comprises a step of removing the first valve seal from the valve via threadably disengaging the threads of the screws from the first valve seal. Additionally, the method comprises a step of installing a second valve seal at least partially within the groove. Furthermore, the method comprises a step of at least partially filling the groove with a curable material in a manner such that the curable material surrounds at least a portion of each of the screws and such that, after curing the curable material, the curable material and the second valve seal will be secured to each other by interlocking geometry. Still further, the method comprises a step of allowing at least a portion of the curable material to cure in a manner such that the curable material becomes cured material that secures the second valve seal to the screws in a manner preventing the second valve seal from being removed from the groove and in a manner such that the second valve seal is positioned to compress against the valve gate when the valve gate is in the closed position.

While the principal features of the invention have been described above, a more complete and thorough understanding of the invention may be obtained by referring to the drawings and the detailed description of the preferred embodiment, which follow.

Figure 1:
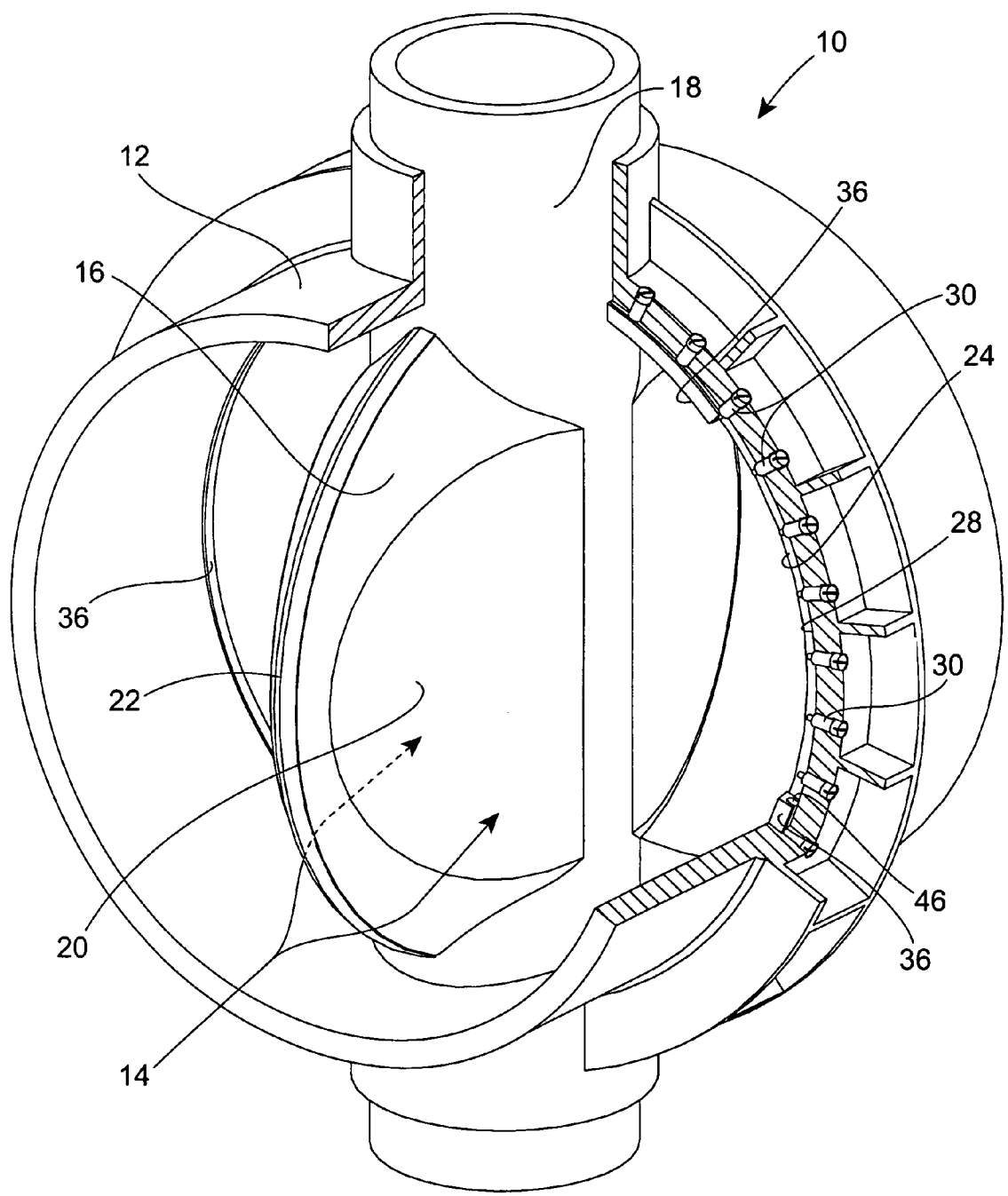
FIG. 1 is breakaway perspective view of a butterfly valve comprising the preferred embodiment of a valve seal assembly in accordance with the invention, and is shown with the gate in the open position.
Figure 2:
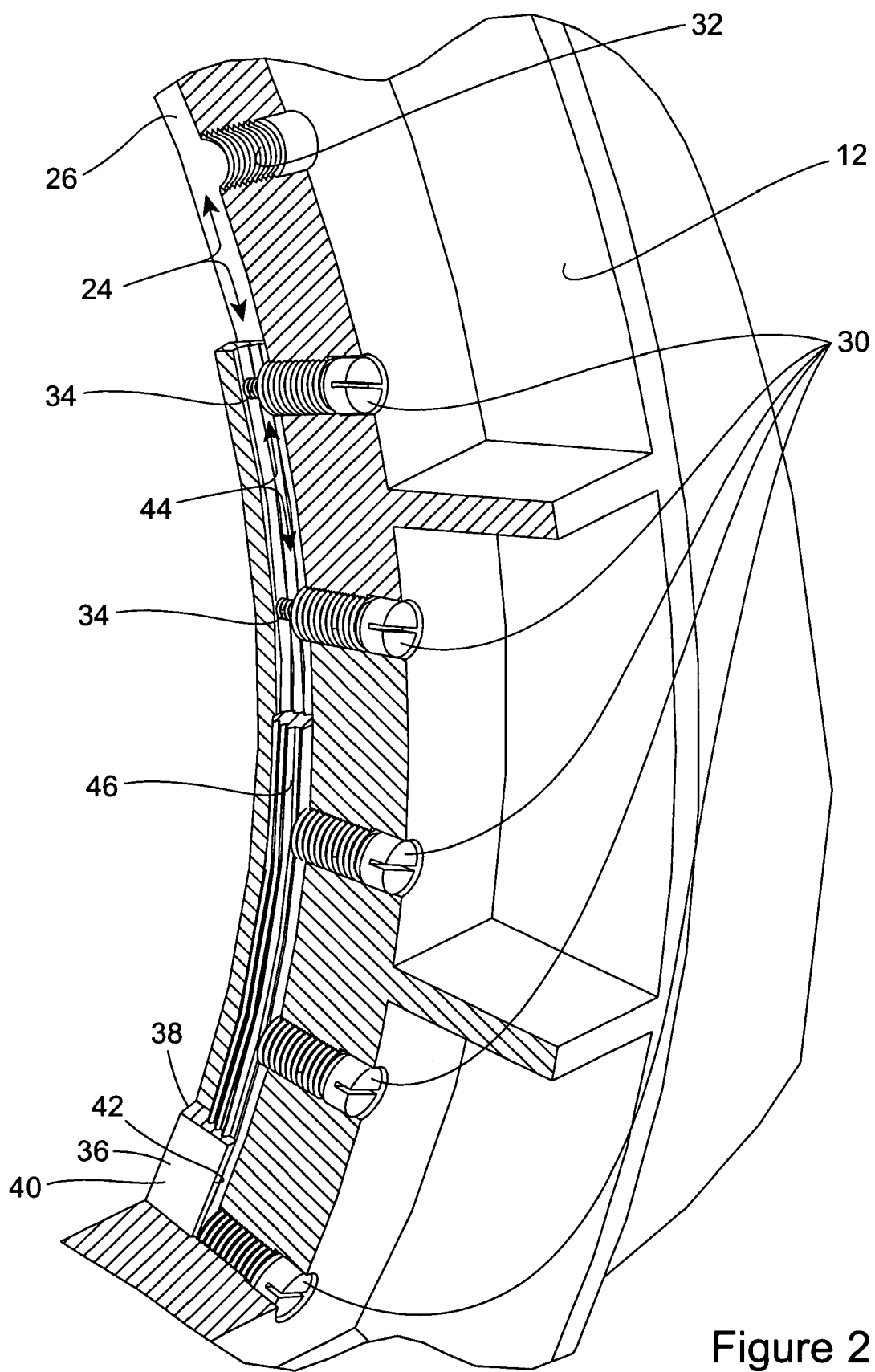
FIG. 2 is a detail breakaway perspective view of the valve seal assembly shown in FIG. 1.

Reference characters in the written specification indicate corresponding items shown throughout the drawing figures.

DETAILED DESCRIPTION OF THE PREFERRED EMBODIMENT OF THE INVENTION

A butterfly valve 10 comprising a valve seal assembly in accordance with the invention is shown in FIG. 1. The butterfly valve 10 comprises a housing 12 having a fluid passageway 14 therethrough, and a discoidal gate 16. The configuration of the gate 16 and the housing 12 is prior art in the relevant field of technology, but is described herein for purposes of describing the present invention.

The gate 16 of the valve 10 is positioned within the fluid passageway 14 of the housing 12 and comprises a gate axle 18 that pivotally connects the gate to the housing. The gate 16 has two opposite faces 20 and a pair of arcuate perimeter sealing faces 22 that are separated by the gate axle 18. The housing 12 preferably comprises a pair of arcuate grooves 24 that extend radially outward into the housing from the fluid passageway 14 and that partially circumscribe the fluid passageway. The grooves 24 are positioned such that the gate axle 18 lies between the grooves. Each groove 24 preferably has a generally rectangular cross-section that forms two opposing planar surfaces 26 and an arcuate base surface 28 that extends between the opposing surfaces and faces radially inward. A plurality of screws 30 extend radially inward into each groove 24 through the base surface 28 of the respective groove. Each screw 30 is threadably engaged with threaded holes 32 that extend radially through the housing 12 and can be accessed for rotation from the exterior of the housing. Each screw 30 also preferably comprises a threaded portion 32 that extends into radially inward into the respective groove 24. This threaded portion 32 is preferably necked-down from the main body of the screw 30.

Figure 3:
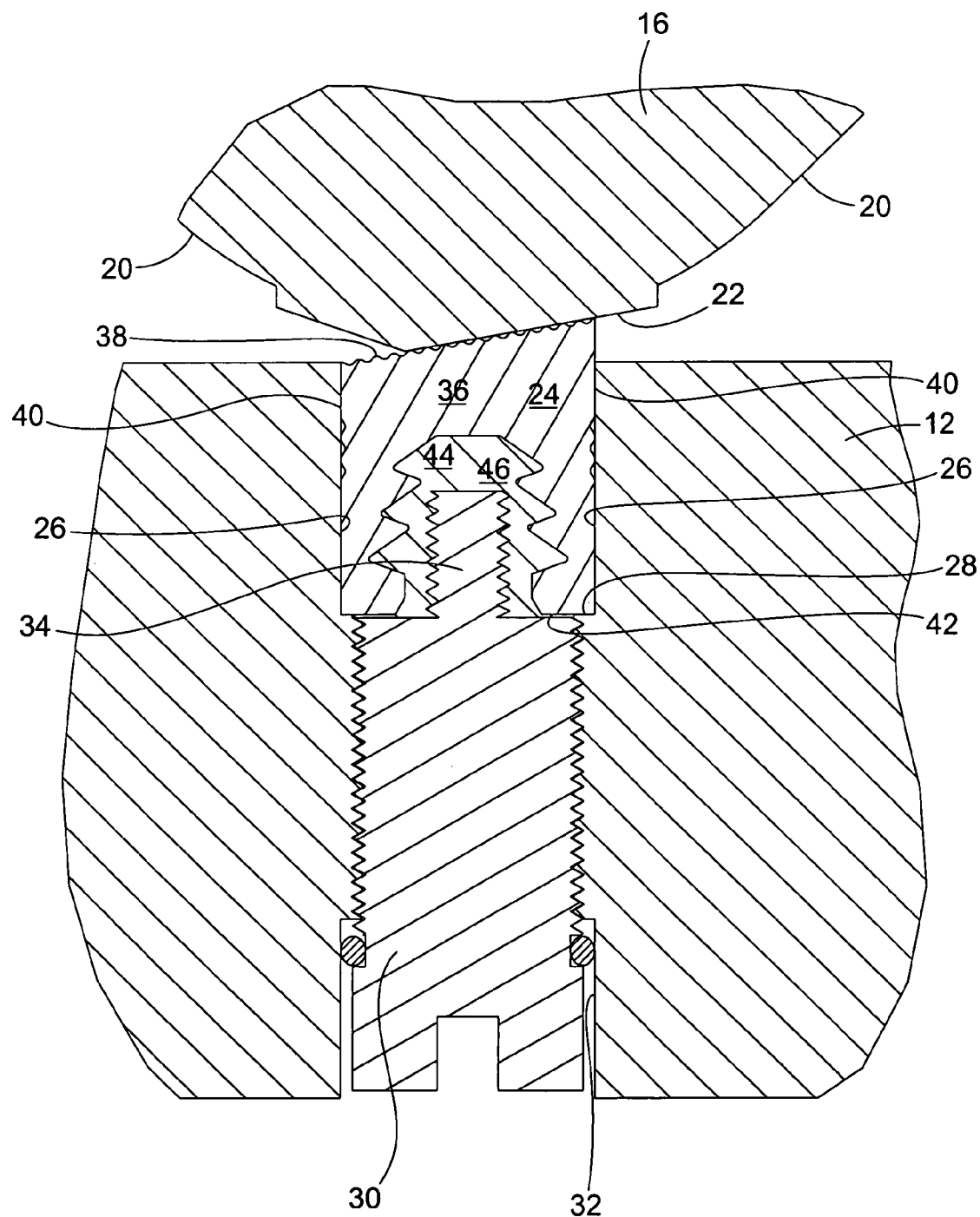
FIG. 3 is a detail view of a cross-section of the preferred embodiment of a valve seal assembly taken about a plane that includes the centerline of the fluid passageway and the axis of one of the screws, and is shown with the valve gate in its closed position, but without a pressure differential across the gate.
Figure 4:
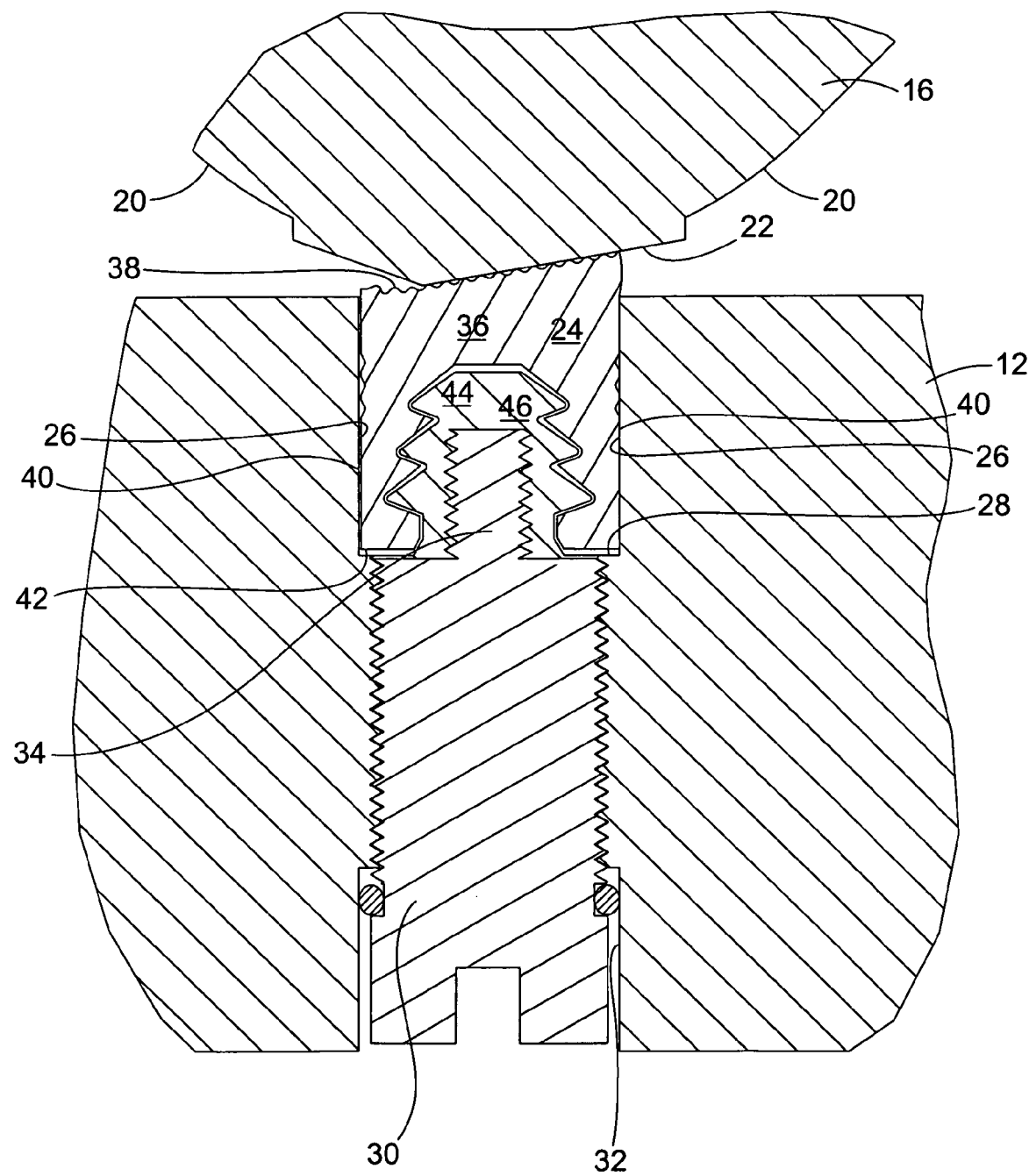
FIG. 4 is a detail view similar to FIG. 3 shown with a pressure differential across the valve gate acting upon the seal.

The butterfly valve 10 of the present invention also comprises a pair of arcuate valve seals 36 that are preferably formed of a resilient rubber or polymeric material. One of the valve seals 36 extends into one of the grooves 24 of the housing 12 and the other of the seals extends into the other of the grooves. Each valve seal 36 preferably comprises a sealing surface 38 that faces generally radially inward toward the centerline of the fluid passageway 14. Each seal 36 also preferably comprises opposite facing side surfaces 40, a radially outward facing base surface 42, and a channel 44. The sealing surface 38 preferably has a partial frusto-conical shape such that its radius of curvature decreases as it extends from one of the side surfaces 40 to the other. The sealing surface 38 is also preferably ribbed as shown in FIGS. 3 and 4. The opposite side surfaces 40 of each seal 36 are preferably generally parallel to each other and are spaced apart from each other in a manner such that the seal fits snugly, or has a slight press-fit, between the opposing surfaces 26 of the groove 24 into which the seal extends. Each side surface 40 also preferably comprises a plurality of arcuate ribs that protrude slightly from the remainder of the side surface. The base surface 42 of each seal 36 is preferably partially cylindrical in shape and preferably is congruent to the base surface 28 of the groove 24 into which the seal extends. The channel 44 of each seal 36 preferably has a cross-sectional shape that is similar to the shape of a Christmas tree, as shown in FIGS. 3 and 4. This cross-sectional shape of each channel 44 may be constant along the circumferential length of the seal 36, but alternatively can vary in some manner such as described and disclosed in U.S. Pat. No. 6,202,983, which is hereby incorporated by reference in its entirety.

Having described the valve seals, the gate, and the housing, the preferred method of installing each seal into a respective one of the grooves of the housing will now be described. Although the seal assembly in accordance with the invention could be used as the original seal assembly of a butterfly valve, the seal assembly may also be used to replace worn seals in existing butterfly valves. In some replacement situations, a valve will already comprise a plurality of screws extending radially into the grooves of the housing. Such screws have been used in prior art valve seal assemblies to secure metal valve seals (not shown) in the grooves of the housing by threadably engaging the screws with threaded openings formed in the metal seals. If this is the case, the screws are turned from the exterior of the housing so as to disengage the screws from the metal seals, thereby allowing the metal seals to be removed from the grooves of the housing. After removing the worn valve seals and removing any debris from the grooves of the housing, either the prior art screws or new screws as described herein are threadably engaged in the threaded holes of the housing and turned in a manner such that they extend into the grooves. Preferably each screw should extend into a respective one of the grooves of the housing a distance less than the depth of the channel of the valve seal.

Prior to inserting the valve seals into the grooves of the housing, preferably all surfaces of the grooves, all surfaces of the portion of each screw extending into the grooves, and at least all surfaces within the channel of each valve seal and the base surface of each valve seal are coated with a thin layer of release material (not shown). The release material can be any form of release material, such as a spray on Teflon® release agent, that will not adhere to epoxy. After this has been done, each seal is forced into a respective one of the grooves of the housing in a manner such that the seal is press-fit between the opposing surfaces of the groove of the housing and such that the base surface of the seal is separated from the base surface of the groove by only the thin layer of release material. The gate of the valve is then pivoted to the closed position. When the gate is in the closed position, the perimeter sealing faces of the gate engage against the sealing surfaces of the valve seals, thereby causing each valve seal to compress between the respective perimeter sealing face of the gate and the base surface of the respective groove of the housing.

After inserting the valve seals into the grooves of the housing as describe above, the air that occupies the channel of each valve seal is pumped out through another opening (not shown) that extend into the grooves of the housing. It should be appreciated that all other openings that extends into the grooves of the housing are blocked as this is performed. With there being a partial vacuum in the channel of each valve seal, epoxy is then forced into the channels of the valve seals through either the same opening used to remove the air from the channels or through one or more other openings. The epoxy is preferably of the type commonly used to replace seals in the valve industry, but could be any suitable epoxy compound. Preferably, all voids in the channel of each valve seal are filled with the epoxy and the epoxy is then pressurized while it is allowed to cure. During this time, the gate preferably remains in the closed position so as to counteract the pressure force exerted by the pressurized epoxy on the seals.

The cured epoxy 46 secures the seals to the screws via interlocking geometry. Thus it should be appreciated that the cross-sectional shape of the channel of each valve seal should be such that epoxy cured therein can not pull out of the channel in one piece without deforming the seal. It should also be appreciated that the screws can not pull out of the epoxy without being unscrewed therefrom. Thus, when the valve is in use and the gate is in the open position, the epoxy prevents the seals from being sucked out of the grooves of the housing by the water rushing through the fluid passageway. When the gate is in the closed position, the perimeter sealing faces of the gate once again engage the sealing surfaces of the seal and thereby exert a radially outward forces on the seals. Moreover, when the valve is in use and the gate is in the closed position, an extremely large pressure differential may be generated across the opposite faces of the gate via the fluid head pressure on the upstream side of the fluid passageway. The fluid head pressure compresses the seals. However, even if the compression is sufficient to force the side surface of each seal on the upstream side of the fluid passageway away from the opposing surface of the respective groove, the seals are configured to react to the head pressure in manner preventing fluid from passing around the gate either between the gate and seals or around the exterior of the seals. More specifically, the release material prevents the seals from being adhered to either the grooves of the housing or the epoxy (although as describe above, the seals remain interlock with the epoxy). Thus, as shown slightly exaggerated in FIG. 4, fluid under high pressure can pass between the side surface of each seal on the upstream side of the fluid passageway and the opposing surface of the respective groove, between the epoxy and seals, and between each seal and the base surface of the respective groove. Thus, it should be appreciated that the net pressure force acting on each seal 36 from the head pressure acts to force the seal radially inward against the gate and in the downstream direction against the downstream opposing surface of the respective groove of the housing. As the pressure increases, so too does this net pressure force. As such, the seals create ever tighter seals as the head pressure increases. Moreover, even if the seals wear over time and their dimensions decrease, the movement of the seals under a head pressure allows the seals to maintain a tight seal against the gate and against the downstream opposing surfaces of the grooves of the housing, thereby preventing fluid from flowing through the valve.

Another advantage of release material is that the release material prevents the epoxy from being adhered to the screws or to the groove of the housing. Thus, if desired, the seals can be easily removed from the valve by unscrewing the screws from the epoxy and then pulling the seals radially inward and out of the grooves of the housing. A new seal can then be installed in the manner described above.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, the term "portion" should be construed as meaning some or all of the item or element that it qualifies.

What is claimed is:

1. A method of installing a valve seal, the method comprising:
    providing a valve, the valve comprising a valve gate, a housing, and a plurality of screws, the housing comprising a fluid passageway that extends through the housing, the housing also comprising a groove that extends into the housing from the fluid passageway, each of the screws having threads that extend into the groove of the housing, the valve gate being movable relative to the housing between opened and closed positions;
    installing an elastomeric valve seal at least partially into the groove;
    at least partially filling the groove with a curable material in a manner such that the curable material surrounds at least a portion of each of the screws and such that, after curing the curable material, the curable material and the valve seal will be secured to each other by interlocking geometry;
    allowing at least a portion of the curable material to cure in a manner such that the curable material becomes cured material that secures the valve seal to the screws in a manner preventing the valve seal from being removed from the groove and in a manner such that the valve seal is positioned to compress against the valve gate when the valve gate is in the closed position.

2. A method in accordance with claim 1 further comprising a step of coating at least a portion of the valve seal with release material, prior to the step of at least partially filling the groove with the curable material, in a manner such that, after the step of allowing at least the portion of the curable material to cure, the valve seal is unadhered to the cured material.

3. A method in accordance with claim 2 further comprising a step of coating a least a portion of the groove with release material, prior to the step of at least partially filling the groove with the curable material, in a manner such that, after the step of allowing at least the portion of the curable material to cure, the portion of the groove is unadhered to the cured material.

4. A method in accordance with claim 1 further comprising a step of coating at least a portion of each of the screws and at least the portion of the groove with release material, prior to the step of at least partially filling the groove with the curable material, in a manner such that, after the step of allowing at least the portion of the curable material to cure, the screws and the groove are unadhered to the cured material, and wherein the step of at least partially filling the groove with a curable material occurs in a manner such that, after the step of allowing at least the portion of the curable material to cure, the cured material can be removed from the groove by threadably disengaging the screws from the cured material and without fracturing the cured material.

5. A method in accordance with claim 1 wherein the step of at least partially filling the groove with the curable material occurs with the valve seal disengaged from the threads of each of the screws, and wherein the step of allowing at least the portion of the curable material to cure occurs in a manner such that the valve seal is disengaged from the threads of each of the screws.

6. A method in accordance with claim 1 wherein each of the steps of at least partially filling the groove with the curable material and allowing at least the portion of the curable material to cure occurs with the valve gate in the closed position and with the valve seal compressed against the valve gate.

7. A method in accordance with claim 1 wherein the step of installing the elastomeric valve seal at least partially within the groove comprises resiliently compressing the valve seal between opposing surfaces of the groove.

* * * * *